(12) United States Patent
Lallukka et al.

(10) Patent No.: US 6,411,630 B1
(45) Date of Patent: Jun. 25, 2002

(54) PROCEDURE FOR RELEASING CONNECTIONS

(75) Inventors: Toivo Lallukka; Jaakko Rautiainen; Sami Kultala; Markku Juntunen; Timo Koskinen; Pekka Lehto, all of Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/313,000

(22) Filed: May 17, 1999

Related U.S. Application Data

(63) Continuation of application No. PCT/FI98/00116, filed on Feb. 10, 1998.

(30) Foreign Application Priority Data

Feb. 25, 1997 (FI) .................................................. 970793

(51) Int. Cl.[7] ................................................ H04Q 3/00
(52) U.S. Cl. ...................... 370/458; 370/216; 370/438; 379/221.04; 379/279
(58) Field of Search .................................. 370/216, 264, 370/434, 437, 438, 439, 458; 379/207, 229, 230, 22.03, 22.04, 221.04, 279

(56) References Cited

U.S. PATENT DOCUMENTS

| | | | | |
|---|---|---|---|---|
| 5,278,972 A | * | 1/1994 | Baker et al. | 379/230 |
| 5,751,574 A | * | 5/1998 | Loebig | 370/437 |
| 5,781,623 A | * | 7/1998 | Khakzar | 370/437 |
| 5,822,420 A | * | 10/1998 | Bolon et al. | 370/437 |

FOREIGN PATENT DOCUMENTS

EP 0 731 618 9/1996

OTHER PUBLICATIONS

ETS300 347–1, Signalling Protocols and Switching (SPS); V interfaces at the digital Local Exchange (LE) V5.2 interface for the support of Access Network (AN) pp. 1–271, Sep. 1994.*

Dec. 1992, A. Gillespie "Interfacing Access Networks to Exchanges: The ETSI V5 Approach" *IEEE Global Telecommunication Conference,* vol. 3, pp. 1754–1758.

1994, K. Khakzar "V5 Interfaces between Digital Local Exchanges and Access Networks" *Frequenz,* vol. 48, pp. 44–50.

* cited by examiner

*Primary Examiner*—Wellington Chin
*Assistant Examiner*—Frank Duong
(74) *Attorney, Agent, or Firm*—Altera Law Group, LLC

(57) ABSTRACT

Procedure for releasing the connection between a user port and an associated channel, or voice time slot, in an access node (AN) connected to a local exchange (LE) via a V5.2 interface. According to the invention, in a situation where there is a break in the V5.2 interface signalling channels, the connection between a user port and the associated channel may be left unreleased. In this case, the unsuccessful release of the connection between the subscriber port and the associated channel is stored in memory and the operation for releasing the connection between the subscriber port and the associated channel is carried out again.

7 Claims, 2 Drawing Sheets

PROCEDURE FOR RELEASING CONNECTIONS

This is a continuation of PCT/FI98/00116 filed Feb. 10, 1998.

BACKGROUND OF THE INVENTION

The present invention relates to a procedure for releasing the connection between a user port and an associated V5.2 channel, i.e. voice time slot, in an access node, as defined in the preamble of claim 1.

An open interface V5.2 between an access node and a telephone exchange is defined in the ETSI (European Telecommunications and Standards Institute) standards of the ETS 300 324 and ETS 300 347 series. The V5.2 interface enables subscribers belonging to a physically separate access network, which may be either a wired or a wireless network, to be connected to a telephone exchange using a standard interface. A dynamic concentrator interface V5.2 consistent with the standards ETS 300 347-1 and 347-2 consists of one or more (1–16) PCM (Pulse Code Modulation) lines. One PCM line comprises 32 channels, each with a transfer rate of 64 kbit/s, i.e. 2048 kbit/s in all. The V5.2 interface supports analogue telephones as used in the public telephone network, digital, such as ISDN (Integrated Services Digital Network) basic and system subscriber connections as well as other analogue or digital terminal equipment based on semi-fixed connections. The V5.2 interface comprises a primary signalling channel and a secondary signalling channel, the latter serving as a backup for the former. These channels are physically located in different PCM cables. When the module line of the primary signalling channel is broken, the primary signalling channel is switched over to the secondary signalling channel in another PCM cable. The BCC protocol (BCC, Bearer Channel Connection), which runs in the primary signalling channel, is used to handle user channel resources in the V5.2 interface. In conjunction with call setup, a user channel is allocated for each subscriber by means of the BCC protocol and a corresponding channel allocation message is transmitted to the access node to allocate the channel, and, based on this, the access node connects the user port to the V5.2 interface time slot in question. When a user channel is to be released, the channel is de-allocated from the local exchange and a message is sent to the access node to notify it about the de-allocation of the channel, whereupon the access node releases the connection of the user port.

When the primary and secondary signalling channels are broken and the break is shorter than the break defined in ETS 300 347 series 300 347-1 ANNEX C, Table C.1 timer TC6, the user channels, or voice time slots, of user ports that had calls going on at the time and which have been disconnected during the break may remain handing in the access node, i.e. they may continue to be busy. For example, if messages relating to the setup or setdown of connections are lost in the V5.2 interface due to disturbances in the PCM line and third-layer retransmission mechanisms cannot provide a successful remedy to the situation, then the user port in the access node may remain in a condition that prevents the subscriber connected to the user port from making and receiving calls. This is because the data tables of the BCC protocol object or resource manager in the access node may still contain information about subscriber connections that, to the knowledge of the local exchange, should no longer exist.

BRIEF SUMMARY OF THE INVENTION

The object of the invention is to eliminate the drawback mentioned. A specific object of the invention is to disclose a procedure that enables hanging connections between user ports and channels to be released. Thus, subscribers are enabled to make and receive calls.

In the procedure of the invention, the operation for releasing the connection between a user port and the associated channel is carried out in an access node connected to a local exchange via a V5.2 interface.

According to the invention, if a subscriber channel has been left hanging in the access node due to a break in the V5.2 interface signalling channels, then the operation for releasing the connection between the subscriber port and the associated channel that failed during the break is stored in the memory of a call control object in the local exchange. After this, the release operation is carried out again to undo the connection between the subscriber port and the associated channel.

In an embodiment of the procedure, a conditional release operation is carried out if the call control object (PSTN and/or ISDN) receives from a BCC protocol object in the local exchange an error code corresponding to an allocation_reject message as defined in the ETS 300 347 series, indicating that the subscriber port has already been connected to a different time slot or that the time slot proposed by the local exchange LE has already been connected to a different subscriber port. The call control object learns from the error code that the connection between the subscriber port and the associated channel is a hanging one, because before receiving the allocation_reject message from the access node, the local exchange has sent to the access node an allocation message, i.e. a message requesting the allocation of a time slot, and when doing so, the local exchange has assumed that the V5.2 interface time slot in question should be free.

In object oriented programming in particular, the basic units of the program structure are objects, which may contain both procedures and data. Objects are classified into different types or categories depending on the kind of properties and functions they have. For instance, a call control object contains procedures related to call control and data required for call control.

In an embodiment of the procedure, in conjunction with the conditional release operation an audit message is transmitted from the local exchange to the access node, asking the access node for information regarding the V5.2 interface PCM line and time slot of a hanging connection between a user port and the associated channel. Based on this enquiry, the hanging connection can be released from the access node.

In an embodiment of the procedure, the local exchange sends to the access node a de-allocation. message, by means of which the release operation is carried out again upon the lapse of a time consisting of the total time of the de-allocation procedure of the BCC protocol and the time indicated by a counter ETS 300 347-1 ANNEX C, Table C.1 timer TC6 when an attempt to the release the user channel has failed during a break in the signalling channels. The counter is an element in the local exchange that generates different calculated time values that are utilised in the local exchange for various delay functions.

In an embodiment of the procedure, call setup is terminated when, based on an error code, hanging connections have to be released.

The invention solves the problem of a subscriber remaining hanging in the access node. The operations defined by the invention allow hanging user channels and hanging time slots reserved for a connection to be released so that the subscriber will be able to make and receive calls.

BRIEF DESCRIPTION OF THE SEVERAL VIEWS OF THE DRAWINGS

In the following, the invention will be described in detail by the aid of embodiment examples by referring to the attached drawing, in which.

DETAILED DESCRIPTION OF THE INVENTION

Figure 1:
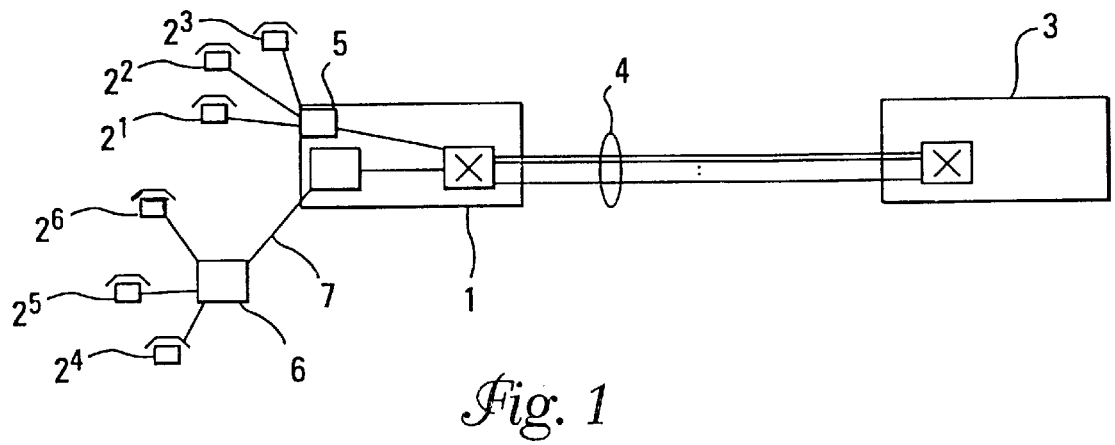
FIG. 1 represents a system according to the present invention.

The system depicted in FIG. 1 comprises an access node 1 with a number of subscribers $2^1$, $2^2$, $2^3$, $2^4$, $2^5$ and $2^6$ connected to it. The access node 1 is connected to a local exchange 3 and it functions between the subscribers $2^1$, $2^2$, $2^3$, $2^4$, $2^5$ and $2^6$, connecting subscribers to the local exchange as illustrated by FIG. 1. The access node 1 is connected via a V5.2 interface 4 comprising 1–16 PCM lines (2 Mbit/s) to the local exchange 3, which is equipped to perform the functions required by the V5 interface. Further, in FIG. 1, subscribers $2^1$, $2^2$, 23 are connected to the access node via a subscriber module 5, which may have analogue or ISDN subscribers connected to it. Further depending on the subscribers, the subscriber module 5 is connected to the access node 1 via module lines or a digital link. Subscribers $2^4$, $2^5$ and $2^6$ are connected to the access node via a remote subscriber node 6. The remote subscriber node is connected to the access node 1 via a PCM line 7.

Figure 2:
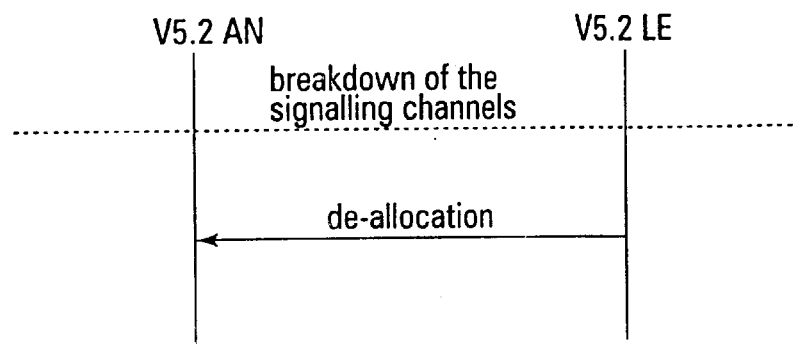
FIG. 2 presents a signalling flow diagram according to the invention.

In FIG. 2, due to a break in the signalling channels, a subscriber channel in the access node AN remains reserved although the subscriber channel has been released at the local exchange LE, signifying an unsuccessful release that is subsequently stored in memory. In this case, after a release message sent from the local exchange LE and a calculated time, preferably 15 seconds, a de-allocation message is transmitted and a new release attempt is made in the access node AN.

Figure 3:
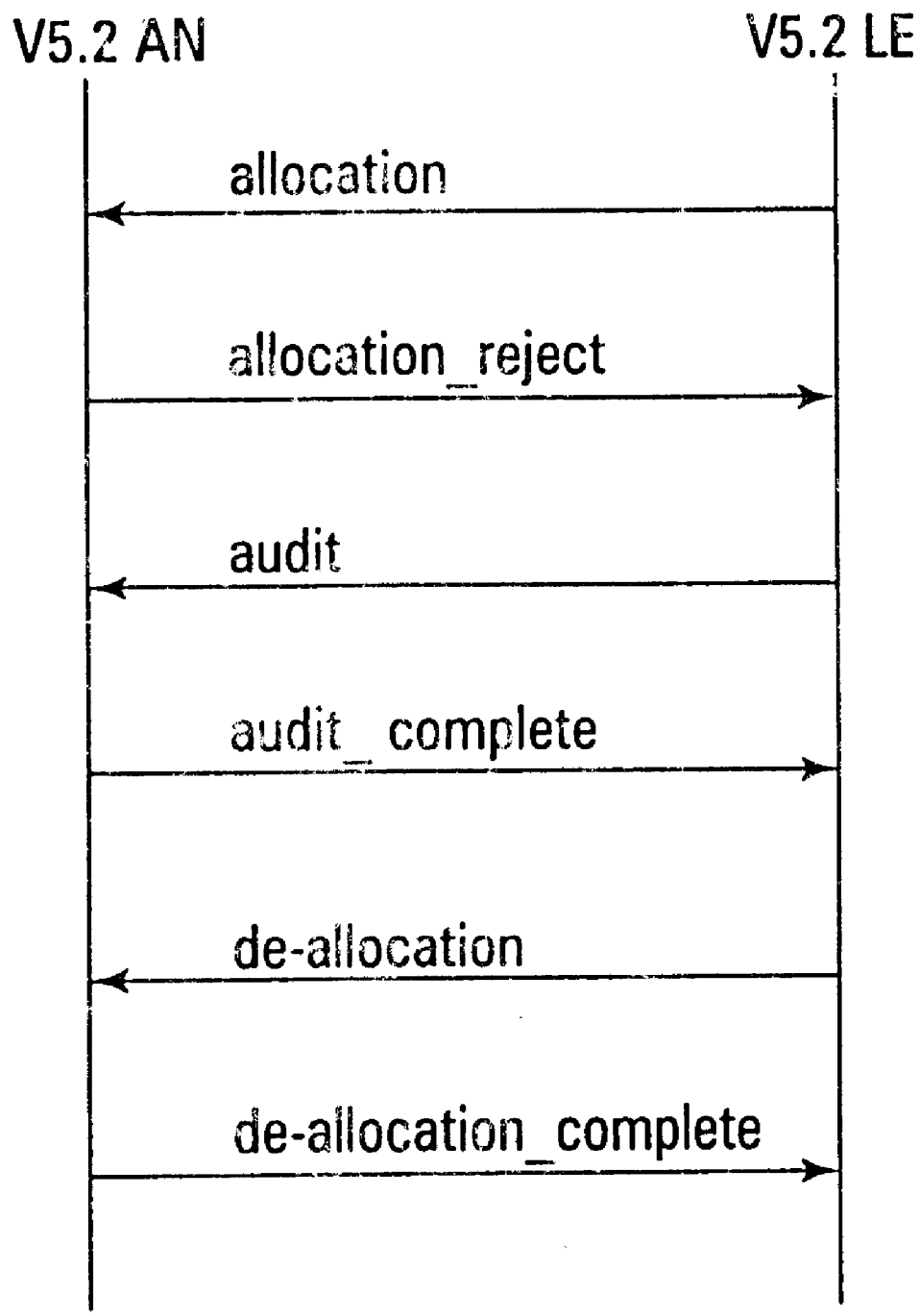
FIG. 3 presents a signalling flow diagram according to the invention.

FIG. 3 illustrates a situation where an attempt to release subscriber channels according to FIG. 2 has failed. In this case, the local exchange LE transmits an allocation message, or a message requesting the allocation of a time slot for the subscriber, to the access node AN. Upon receiving the allocation message, the access node AN sends the local exchange LE an allocation_reject message, because the local exchange LE is trying to allocate a reserved subscriber channel in the access node AN. The allocation_reject message contains an error code which indicates that the subscriber port has already been connected to a different time slot or that a given time slot proposed by the local exchange LE has already been connected to a different subscriber port. The local exchange LE transmits an audit message to the access node AN. This message is used to determine the PCM line and time slot of a busy subscriber. The access node AN responds to the audit message by sending to the local exchange an audit_complete message. Based on this, the local exchange LE sends the access node AN a de-allocation message, which releases the busy subscriber or time slot. The access node acknowledges the de-allocation message by sending a de-allocation_complete message to the local exchange LE. For the local exchange LE to receive an error code from the access node AN, it is necessary to try to set up a call to the subscriber or the reserved channel. The local exchange LE can finally terminate this call setup.

The invention has been described above only by way of example by the aid of one of its preferred embodiments. This is naturally not meant to limit the invention, but many alternatives and variations are possible within the sphere of protection defined by the attached set of claims.

What is claimed is:

1. A method for releasing a connection between a user port and an associated user channel in an access node, the access node being connected to a local exchange via a V5.2 interface having interface signaling channels, the method comprising:

storing information indicating an unsuccessful release of the connection between the user port and the associated user channel, when a break in a connection of the interface signaling channels between the access node and the local exchange results in an unsuccessful release at the access node of the connection between the user port and the associated user channel; and reinitiating a previously unsuccessful release operation to release the connection between the user port and the associated user channel.

2. The method as defined in claim 1, wherein reinitiating comprises reinitiating the release operation after a de-allocation procedure and a predetermined calculated time.

3. The method as defined in claim 1, wherein reinitiating comprises reinitiating the release operation when an error code, indicating the user port has already been connected to a different channel, is received in the local exchange in conjunction with call setup.

4. The method as defined in claim 1, wherein reinitiating comprises reinitiating the release operation when an error code, indicating that a channel that the local exchange proposes to allocate has already been connected to a different user port, is received in the local exchange in conjunction with call setup.

5. The method as defined in claim 1, wherein the access node is sent an inquiry requesting user channel parameters to enable the connection between the user port and the associated user channel to be released.

6. The method as defined in claim 1, wherein communication between the access node and the local exchange for allocation and de-allocation of channels is effected using a BCC protocol defined according to V5.2 specifications.

7. The method as defined in claim 1, wherein call setup is terminated after a channel release operation based on an error code.

* * * * *